US012304724B2

(12) United States Patent
Kohen

(10) Patent No.: US 12,304,724 B2
(45) Date of Patent: May 20, 2025

(54) FLEXIBLE TANK HAVING RING PART

(71) Applicant: LIKUA ENDUSTRIYEL AMBALAJ MALZM. SAN. VE TIC. LTD. STI., Istanbul (TR)

(72) Inventor: Yusuf Kohen, Istanbul (TR)

(73) Assignee: LIKUA ENDUSTRIYEL AMBALAJ MALZM. SAN. VE TIC. LTD. STI., Istanbul (TR)

( * ) Notice: Subject to any disclaimer, the term of this patent is extended or adjusted under 35 U.S.C. 154(b) by 106 days.

(21) Appl. No.: 18/286,238

(22) PCT Filed: Jan. 17, 2022

(86) PCT No.: PCT/TR2022/050027

§ 371 (c)(1),
(2) Date: Oct. 10, 2023

(87) PCT Pub. No.: WO2022/220769

PCT Pub. Date: Oct. 20, 2022

(65) Prior Publication Data

US 2024/0199317 A1 Jun. 20, 2024

(51) Int. Cl.
*B65D 88/22* (2006.01)
*B65D 90/08* (2006.01)
*B67D 7/02* (2010.01)

(52) U.S. Cl.
CPC ............. *B65D 88/22* (2013.01); *B65D 90/08* (2013.01); *B67D 7/02* (2013.01)

(58) Field of Classification Search
CPC .................... B65D 88/22; B65D 90/08; B65D 2590/0066; B67D 7/02
See application file for complete search history.

(56) References Cited

U.S. PATENT DOCUMENTS 2,851,075 A * 9/1958 Palfey .................... B65D 88/22 220/666
4,132,310 A * 1/1979 Dorsch ..................... B60P 7/12 206/386
6,186,713 B1 * 2/2001 Bonerb .................. B60P 3/426 410/97

FOREIGN PATENT DOCUMENTS

| | | |
|---|---|---|
| DE | 10361603 A1 | 7/2005 |
| TR | 200700090 | 3/2007 |
| TR | 200808670 | 1/2009 |
| TR | 201611603 | 11/2016 |
| WO | 2008109951 A1 | 9/2008 |
| WO | 2010056219 A2 | 5/2010 |
| WO | 2018070954 A2 | 4/2018 |

* cited by examiner

*Primary Examiner* — Jason K Niesz
(74) *Attorney, Agent, or Firm* — Bayramoglu Law Offices LLC

(57) ABSTRACT

A flexible tank for carrying liquid or liquid-based material in a vehicle chassis or in a container is provided, and the flexible tank has a body which defines a closed volume, at least one ring part which narrows the cross-section of said body and which forms at least one first compartment and at least one second compartment, and the flexible tank further has at least one filling inlet. Accordingly, the improvement is that the subject matter flexible tank includes at least one folding region defined between one each folding lines provided at a first distance at both sides of the ring part and folded onto or under at least one of the first compartment and the second compartment after approaching of the folding lines to each other.

6 Claims, 5 Drawing Sheets

FLEXIBLE TANK HAVING RING PART

CROSS REFERENCE TO THE RELATED APPLICATIONS

This application is the national phase entry of International Application No. PCT/TR2022/050027, filed on Jan. 17, 2022, which is based upon and claims priority to Turkish Patent Application No. 2021/006636, filed on Apr. 15, 2021, the entire contents of which are incorporated herein by reference.

TECHNICAL FIELD

The present invention relates to a flexible tank provided for carrying liquid or liquid-based material, stored in said flexible tank, in a vehicle chassis or in a container.

BACKGROUND

Flexible tanks are used in carrying liquids or liquid-based materials. Vehicles which carry flexible tank, which is full of liquid, essentially between two locations are essentially truck-type land vehicles. Liquid fluctuations occur inside flexible tanks, which are full of liquid, due to road conditions like the presence of ramps or road deteriorations or driver-sourced reasons like acceleration of the vehicle. While the vehicle is moving, when the liquid flows forwardly, the liquid begins to rise and the potential energy gained after this rise increases exponentially during the return, and this creates hydrodynamic load. Said hydrodynamic load may give damage to the seaming regions of the components which form the flexible tank. Said seaming regions may be subjected to intense stresses, and the flexible tank may get fragmented through the seaming regions. This leads to loss of liquid. Even if the flexible tank does not tear, driving safety may be compromised since yawing occurs with big intensity. As a solution to this problem, some wave preventing flexible tank embodiments have been provided.

In order to carry liquid or a liquid-based material, a flexible tank is placed to the vehicle chassis or to a container horizontally, and is connected to the chassis and to the container from various regions. The force, created by the weight of the liquid-based material, acts on the base, and the flow of the material continues mostly at the base side. For this reason, an unbalanced material flow occurs. Although the connection elements form baffles which provide compartment appearance, they cannot completely prevent turbulence.

In the utility model with number TR 2008/08670, a flexible tank, which prevents wave formation, is described for carrying liquid or liquid-based materials. Said flexible tank consists of more than one compartment connected to each other in a manner including a curved form. There are openings, which allow liquid passage, between the compartments. In the utility model with number TR 2007/00090, a flexible tank wherein liquid can be stored is described. The flexible tank has pluralities of compartments provided such that liquid passage is allowed between at least two of said compartments. The passage surfaces between the compartments in said flexible tanks are obtained by welding the compartments and by forming gaps on the welding surfaces. Compartments are separate elements in flexible tanks and are connected to each other. Joining and welding process leads to labor burden and create risks in production and in the product. In these applications, said flexible tanks lead to a severe labor power loss.

In the application with number TR 2016/11603, a flexible tank embodiment is provided for solving the abovementioned problems and for solving wave formation problem by means of a simple application. In said embodiment, there are knuckle regions in a manner narrowing the cross-section of the flexible tank and there is a ring part which encircles these knuckle regions and which narrows the cross-section. The problems, which exist in this application, are the form deteriorations which may occur due to the position of the ring part and the fragmentation of the ring part because of the insufficient resistance of the ring part due to the formed inner pressure. In other words, as can be seen in FIG. 12, the vertical components of the inner pressure, which occurs at the parts where the flexible tank cross-section slightly increases in the vicinity of the ring part, create a force which shall push the ring part outwardly. This may lead to fragmentation of the ring part. In cases where the ring part is not fragmented, the narrowing which occurs in the cross-section leads to increase of the flow rate in the section with narrowing cross-section, and it is seen that the aimed baffle effect decreases.

As a result, because of the abovementioned problems, an improvement is required in the related technical field.

SUMMARY

The present invention relates to a flexible tank, for eliminating the abovementioned disadvantages and for bringing new advantages to the related technical field.

An object of the present invention is to provide a flexible tank where the breakages which occur at the ring part are prevented and where the baffle effect is increased.

In order to realize the abovementioned objects and the objects which are to be deducted from the detailed description below, the present invention is a flexible tank for carrying liquid or liquid-based material in a vehicle chassis or in a container, and said flexible tank has a body which defines a closed volume, at least one ring part which narrows the cross-section of said body and which forms at least one first compartment and at least one second compartment, said flexible tank further has at least one filling inlet. Accordingly, the subject matter flexible tank comprises at least one folding region defined between one each folding lines provided at a first distance at both sides of the ring part and folded onto or under at least one of the first compartment and the second compartment after approaching of said folding lines to each other. Thus, after filling, the section which remains between the ring part and the folding line stays in a substantially orthogonal form to the floor, and depending on this, the baffle effect is increased and at the same time, the inner pressure forces coming to the ring part are decreased and the breakage of the ring part is prevented.

In a possible embodiment of the present invention, at least one fixation element is provided for providing fixation of the folding region folded onto or under at least one of the first compartment and the second compartment. Thus, the flexible tank can be carried in a folded manner before filling and can be waited in a form ready for filling.

The present invention is moreover a filling method for a flexible tank for carrying liquid or liquid-based material, stored in said flexible tank, in a vehicle chassis or in a container, and having a body which defines a closed volume, at least one ring part which narrows the cross-section of said body and which forms at least one first compartment and at least one second compartment. Accordingly, the filling method comprises the steps of: engaging at least one ring part onto the body of the flexible tank in a manner defining at least one first compartment and at least one second compartment at two sides of the ring part before filling of the flexible tank, approaching the folding lines to each other which are defined at a first distance with respect to the ring part at both sides of the ring part, folding at least one folding region, which remains between the folding lines, onto or under at least one of the first compartment and the second compartment, filling the material, which is to be carried, into the body through the filling inlet. Thus, after filling, the section which remains between the ring part and the folding line stays in a substantially orthogonal form to the floor, and depending on this, the baffle effect is increased and at the same time, the inner pressure forces coming to the ring part are decreased and the breakage of the ring part is prevented.

In a possible embodiment of the present invention, after folding at least one folding region, which remains between the folding lines, onto or under at least one of the first compartment and the second compartment, the step of fixing by means of at least one fixation element is provided. Thus, the flexible tank can be carried in a folded manner before filling and can be waited in a form which is suitable for filling.

In a possible embodiment of the present invention, the step of folding said folding region onto or under one of the first compartment and the second compartment which is far from the filling inlet is provided.

In a possible embodiment of the present invention, the step of folding the folding region through the second folding lines defined between the ring part and the folding lines and folding onto or under both of the first compartment and the second compartment is provided.

REFERENCE NUMBERS

Figure 1:
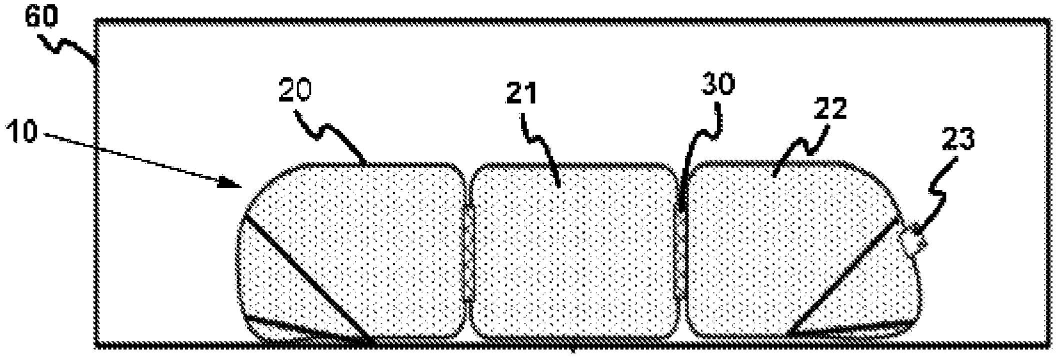
In FIG. 1, a representative lateral view of the subject matter flexible tank in the container is given.

10 Flexible tank
20 Body
21 First compartment
22 Second compartment
23 Filling inlet
30 Ring part
40 Folding line
41 Second folding line
50 Folding region
51 Fixation element
60 Container
h First distance

DETAILED DESCRIPTION OF THE EMBODIMENTS

In this detailed description, the subject matter flexible tank (10) is explained with references to examples without forming any restrictive effect only in order to make the subject more understandable.

Figure 2:
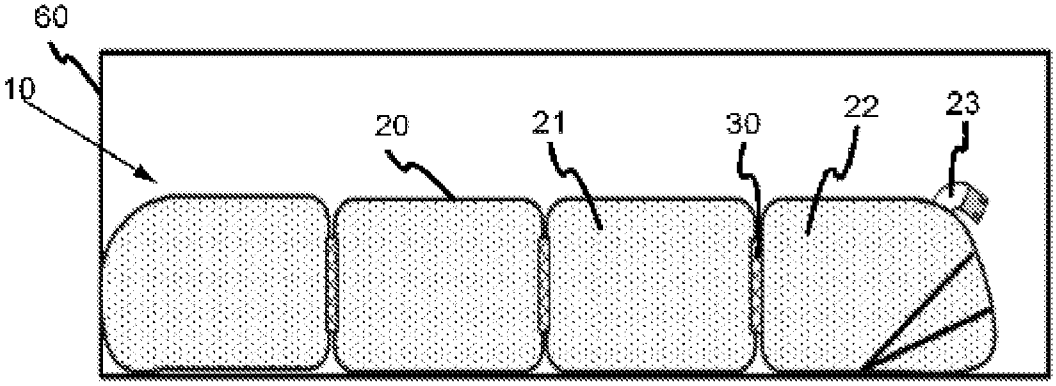
In FIG. 2, a representative lateral view of a possible embodiment of the subject matter flexible tank in the container is given.
Figure 3:
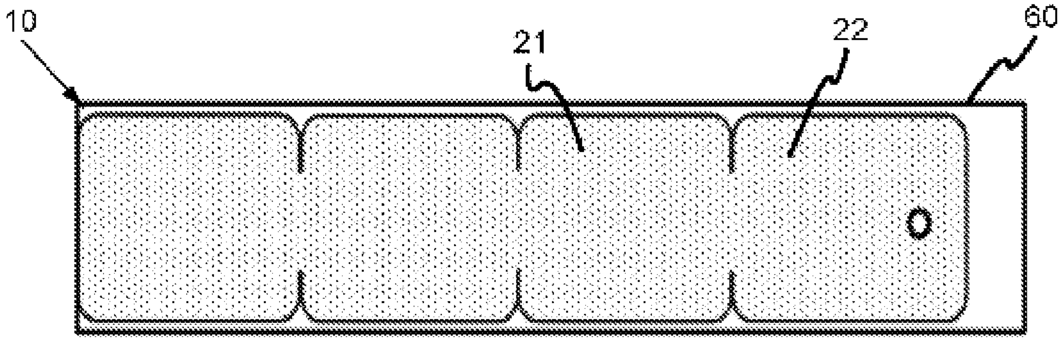
In FIG. 3, a representative top view of the subject matter flexible tank in the container is given.

With reference to FIGS. 1-3, the subject matter flexible tank (10) has a body (20). Said body (20) defines a closed volume in a manner providing carrying of liquid or liquid-based materials therein. There is at least one filling inlet (23) provided on the body (20).

There is at least one ring part (30) which encircles the body (20) and which narrows the cross-section of the body (20). Said ring part (30) forms the body (20) such that there is a first compartment (21) and a second compartment (22) at both sides. In the possible embodiment of the present invention, the number of ring parts (30) can be increased, and depending on this, the number of compartments can be increased.

Figure 4:
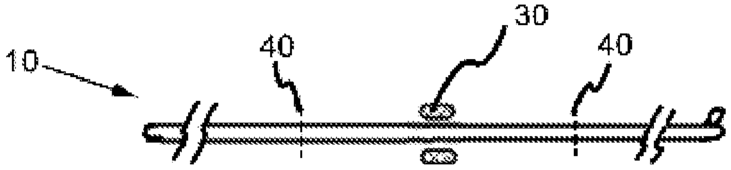
In FIG. 4, a representative view of the condition of fixing the ring part onto the body before filling of the subject matter flexible tank is given.
Figure 5:
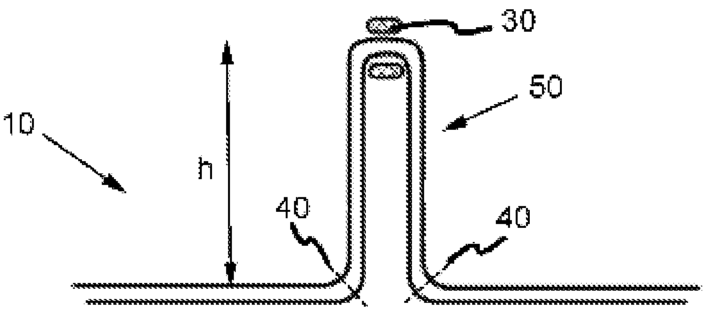
In FIG. 5, a representative view of formation of folding region by folding the subject matter flexible tank is given.
Figure 6:
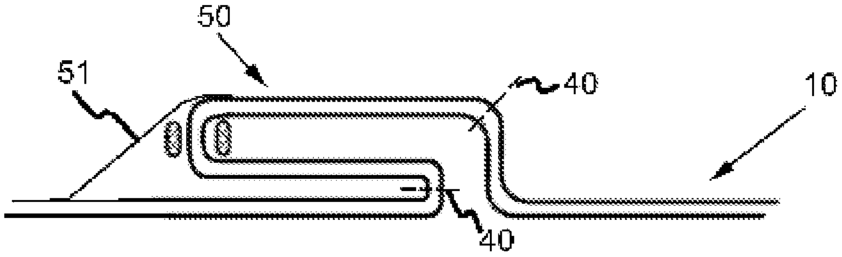
In FIG. 6, a representative view of folding and fixation of the folding region of the subject matter flexible tank onto the body is given.
Figure 7:
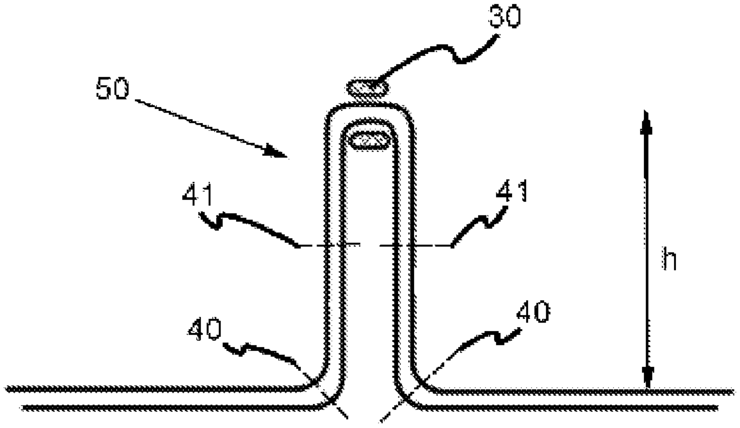
In FIGS. 7 and 8, the representative views of folding and fixation through the second folding line at the folding region of the subject matter flexible tank are given.
Figure 8:
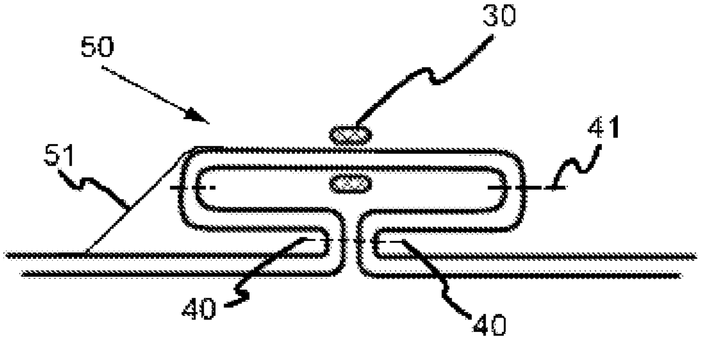

As can be seen in FIG. 4, in the subject matter flexible tank (10), the ring part (30) is engaged onto the body (20) while the body (20) is empty. At two sides of said ring part (30), one each folding lines (40) are defined at a first distance with respect to the ring part (30). The part which remains between said folding lines (40) is defined as a folding region (50). Afterwards, the ring part (30) is raised upwardly from the floor at an amount essentially equal to the first distance (h), and the folding lines (40) are approached to each other (FIG. 5). Thus, the parts of the folding region (50) which remain between the ring part (30) and the folding lines (40) at the two sides of the ring part (30) are brought side by side. In other words, the folding region (50) has been brought into a form extending upwardly from the floor. At the continuation, as can be seen in FIG. 6, the folding region (50) is reposed onto at least one of the first compartment (21) and the second compartment (22). In a possible embodiment of the present invention, the folding region (50) is reposed onto one of the first compartment (21) and the second compartment (22) which is far from the filling inlet (23). As can be seen in FIGS. 7 and 8, in another possible embodiment of the present invention, one each second folding lines (41) are defined between the ring part (30) and the folding lines (40) and the sections which remain between the ring part (30) and the folding line (40) are folded again through the second folding lines (41), and the folding region (50) is reposed onto the first compartment (21) and onto the second compartment (22) at the same time.

In a possible embodiment of the present invention, there is at least one fixation element (51) for providing staying of the folding region (50) in a reposed form onto the first compartment (21) and/or onto the second compartment (22).

Said fixation element (51) is essentially a band. Thanks to said fixation element (51), the folds stay in an unfolded form during transportation of the flexible tank (10) before filling thereof. At the same time, the fixation element (51) prevents unfolding of the folds for a while during filling and it at least partially prevents passage of the fluid material to a next compartment.

Figure 9:
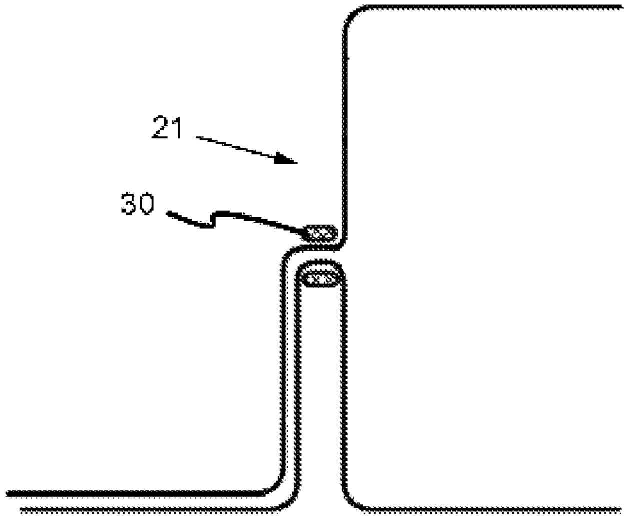
In FIGS. 9 and 10, the representative views of the form changes of the subject matter flexible tank during filling are given.
Figure 10:
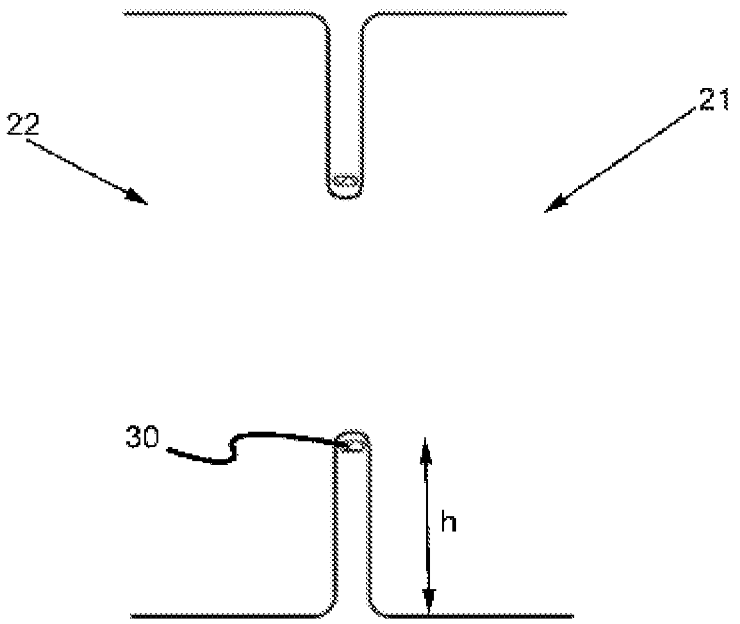

With reference to FIGS. 9 and 10, thanks to the subject matter flexible tank (10) embodiment, during filling, the fluid material is firstly filled into the first compartment (21) where the filling inlet (23) is associated. Thanks to the folding region (50) which remains between the first compartment (21) and the second compartment (22) and thanks to the realized folding process, passage of the fluid material to the second compartment (22) is at least partially prevented. Thanks to this, first of all, the first compartment (21) is substantially filled, and the part which remains between the ring part (30) and the folding line (40) is provided to stay in a substantially orthogonal form with respect to the floor. At the continuation of the filling process, the fluid material begins filling into the second compartment (22) and thanks to the folding realized in the folding line (40) at the side of the ring part (30) facing the second compartment (22), a form which is similar to the form of the first compartment (21) is obtained.

Thanks to said embodiment, since the parts which remain between the ring part (30) and the folding lines (40) extend in a substantially orthogonal direction with respect to the floor, the vertical components of the fluid pressure formed at these parts are reduced when compared with the prior art. Thanks to this, the fluid pressure which shall force the ring part (30) outwardly is close to zero or substantially reduced. Thus, only the force, which is equal to the fluid pressure which exists at the parts of the ring part (30) which contact the body (20), is exerted onto the ring part (30). This means the pressure exerted on the ring part (30) is reduced, and the breakage of the ring part (30) is prevented.

On the other hand, since the parts which exist between the ring part (30) and the folding lines (40) extend in a substantially orthogonal direction to the floor, the baffle effect at these parts is increased. Moreover, since the entry of the fluid to the cross-section narrowed by the ring part (30) becomes difficult, the increase of fluid speed in these cross-sections is reduced when compared with the prior art.

In a possible embodiment of the present invention, the first distance (h), defined between the ring part (30) and the folding line (40), is essentially provided as equal to ⅓ of the height of the flexible tank (10) after filling. On the other hand, in a possible embodiment of the present invention, the periphery of the ring part (30) is provided nearly half of the outer periphery of the flexible tank (10). Thanks to this proportioning, optimum baffle effect is provided, and at the same time, the flexible tank (10) is filled and used without fragmentation of the ring part (30).

Figure 11:
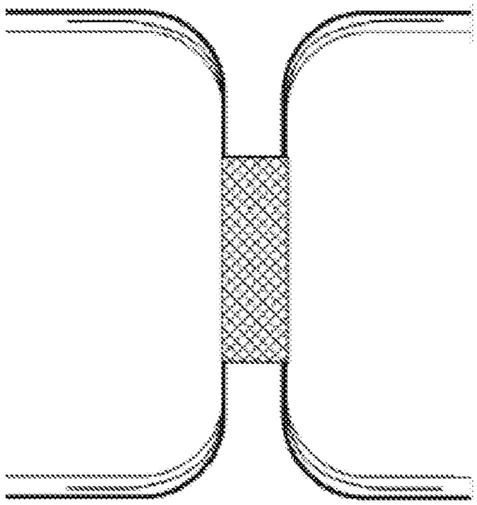
In FIG. 11, a representative view of the multi-layered version of the subject matter flexible tank after filling is given.
Figure 12:
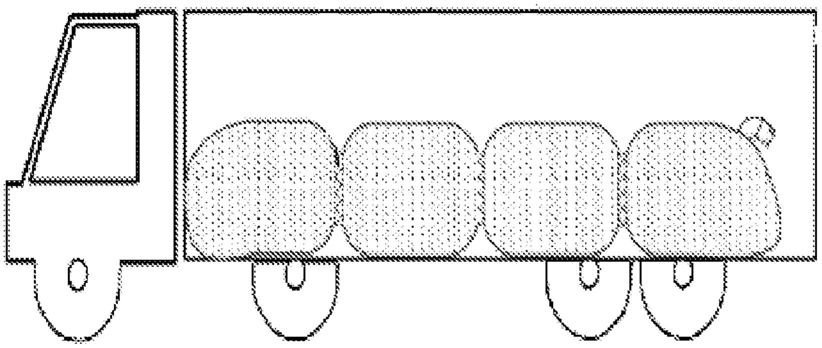
Figure 12 (Prior Art)
In FIG. 12, a representative lateral view of the flexible tank used in the prior art is given.

As can be seen in FIG. 11, the body (20) can consist of pluralities of layers.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A flexible tank for carrying liquid or liquid-based material in a vehicle chassis or in a container, wherein the flexible tank has a body, at least one ring part and at least one filling inlet, wherein the body defines a closed volume, and the at least one ring part narrows a cross-section of the body and forms at least one first compartment and at least one second compartment, wherein the flexible tank comprises at least one folding region defined between one each folding lines provided at a first distance at both sides of the ring part and folded onto or under at least one of the first compartment and the second compartment after approaching of the folding lines to each other.

2. The flexible tank according to claim 1, wherein at least one fixation element is provided for providing fixation of the folding region folded onto or under at least one of the first compartment and the second compartment.

3. A filling method for a flexible tank for carrying liquid or liquid-based material, stored in the flexible tank, in a vehicle chassis or in a container, wherein the flexible tank has a body and at least one ring part, wherein the body defines a closed volume, and the at least one ring part narrows a cross-section of the body and forms at least one first compartment and at least one second compartment, wherein the filling method comprises steps of:

engaging at least one ring part onto the body of the flexible tank in a manner defining the at least one first compartment and the at least one second compartment at two sides of the ring part before filling of the flexible tank, approaching first folding lines to each other which are defined at a first distance with respect to the ring part at both sides of the ring part, folding at least one folding region, which remains between the first folding lines, onto or under at least one of the first compartment and the second compartment, and filling a material, which is to be carried, into the body through the filling inlet.

4. The flexible tank filling method according to claim 3, further comprising: after folding at least one folding region, which remains between the first folding lines, onto or under at least one of the first compartment and the second compartment, fixing by at least one fixation element.

5. The flexible tank filling method according to claim 3, further comprising: folding the folding region onto or under one of the first compartment and the second compartment which is far from the filling inlet.

6. The flexible tank filling method according to claim 3, further comprising: folding the folding region through second folding lines defined between the ring part and the first folding lines and folding onto or under both of the first compartment and the second compartment.

* * * * *